US012315329B2

(12) United States Patent
Lamb et al.

(10) Patent No.: US 12,315,329 B2
(45) **Date of Patent: *May 27, 2025**

(54) METHOD AND SYSTEM FOR A GAMING SYSTEM USER INTERFACE

(71) Applicant: Video Gaming Technologies, Inc., Franklin, TN (US)

(72) Inventors: William Douglas Lamb, Eagleville, TN (US); Daniel William Rice, Thompson Station, TN (US); Victor Brent McClearen, Cookeville, TN (US); Charles Stanley Curbbun, Encinitas, CA (US); Arvin Grande Abadilla, Encinitas, CA (US); Matthew Kranz, Encinitas, CA (US); Julian Groeli, San Diego, CA (US); Blake Chuanlun Wang, San Diego, CA (US); Jin Chen, Carlsbad, CA (US); William John Leach, San Diego, CA (US)

(73) Assignee: Video Gaming Technologies, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,238

(22) Filed: Apr. 3, 2024

(65) Prior Publication Data

US 2024/0273969 A1 Aug. 15, 2024

Related U.S. Application Data

(60) Continuation of application No. 18/155,619, filed on Jan. 17, 2023, now Pat. No. 11,983,986, which is a (Continued)

(51) Int. Cl.

*G07F 17/32* (2006.01)
*G07F 17/34* (2006.01)

(52) U.S. Cl.

CPC ...... *G07F 17/3213* (2013.01); *G07F 17/3209* (2013.01); *G07F 17/3211* (2013.01);

(Continued)

(58) Field of Classification Search

CPC ............ G07F 17/3213; G07F 17/3209; G07F 17/3211; G07F 17/3216; G07F 17/3227; G07F 17/323; G07F 17/3239; G07F 17/34

See application file for complete search history.

(56) References Cited

U.S. PATENT DOCUMENTS 5,302,015 A 4/1994 Du Vall
D399,670 S 10/1998 Miller et al.

(Continued)

FOREIGN PATENT DOCUMENTS

WO 2014108141 A1 7/2014

OTHER PUBLICATIONS

Notice of Allowance dated Aug. 13, 2020 for U.S. Appl. No. 14/498,638 (pp. 1-5).

(Continued)

*Primary Examiner* — Thomas H Henry
(74) *Attorney, Agent, or Firm* — Armstrong Teasdale LLP

(57) ABSTRACT

A gaming machine includes a base, a columnar pedestal extending vertically from the base, and a button deck adjustably coupled to the pedestal. The button deck includes an upper surface including a transparent touchscreen element, a lower surface opposite the upper surface, and a button deck body extending therebetween. At least one of the lower surface and the body include one or more transparent display elements, the one or more transparent display elements are configured to generate images of gaming machine control actuators viewable on the upper surface. The transparent touchscreen element is configured to receive (Continued)

touches and gestures indicating control inputs. The gaming machine also includes a player tracking card reader positioned within the button deck and accessible through a slot in a front edge of the button deck, the player tracking card reader communicatively coupled to a player tracking display area of the gaming machine.

20 Claims, 4 Drawing Sheets

Related U.S. Application Data continuation of application No. 17/107,526, filed on Nov. 30, 2020, now Pat. No. 11,568,705, which is a division of application No. 14/498,638, filed on Sep. 26, 2014, now Pat. No. 10,854,039.

(52) U.S. Cl.
CPC ...... *G07F 17/3216* (2013.01); *G07F 17/3227* (2013.01); *G07F 17/323* (2013.01); *G07F 17/3239* (2013.01); *G07F 17/34* (2013.01)

(56) References Cited

U.S. PATENT DOCUMENTS

| | | | | |
|---|---|---|---|---|
| 6,008,784 | A | 12/1999 | Acres et al. | |
| 6,102,394 | A | 8/2000 | Wurz et al. | |
| 6,102,476 | A | 8/2000 | May et al. | |
| 6,217,448 | B1 | 4/2001 | Olsen | |
| 6,514,145 | B1 | 2/2003 | Kawabata et al. | |
| 6,530,842 | B1 | 3/2003 | Wells et al. | |
| 6,637,844 | B1 | 10/2003 | Luciano, Jr. et al. | |
| 6,646,695 | B1 | 11/2003 | Gauselmann | |
| 7,166,029 | B2 | 1/2007 | Enzminger | |
| 7,217,191 | B2 | 5/2007 | Cordell | |
| 7,562,872 | B2 | 7/2009 | Okada | |
| 7,665,939 | B1 | 2/2010 | Cardona | |
| 7,699,315 | B2 | 4/2010 | Hirato et al. | |
| 7,896,746 | B2 | 3/2011 | Borissov | |
| 7,918,725 | B2 | 4/2011 | Baerlocher | |
| 7,955,176 | B2 | 6/2011 | Tastad et al. | |
| 8,012,027 | B2 | 9/2011 | McGahn et al. | |
| 8,047,916 | B2 | 11/2011 | Seelig et al. | |
| 8,096,884 | B2 | 1/2012 | Beadell et al. | |
| 8,113,517 | B2 | 2/2012 | Canterbury et al. | |
| 8,118,681 | B2 | 2/2012 | Mattice et al. | |
| 8,137,185 | B2 | 3/2012 | Crowder, Jr. et al. | |
| 8,177,637 | B2 | 5/2012 | Beadell et al. | |
| 8,216,046 | B2 | 7/2012 | Ikeya et al. | |
| 8,216,074 | B2 | 7/2012 | Sakuma | |
| 8,262,480 | B2 | 9/2012 | Cohen et al. | |
| 8,430,756 | B2 | 4/2013 | McComb et al. | |
| 8,439,761 | B2 | 5/2013 | O'Keene et al. | |
| 8,715,079 | B1 | 5/2014 | Loose | |
| 8,740,706 | B2 | 6/2014 | Klein et al. | |
| 2002/0084395 | A1 * | 7/2002 | Johnson | A47B 46/005<br>248/286.1 |
| 2004/0149866 | A1 | 8/2004 | Boucher | |
| 2005/0026702 | A1 * | 2/2005 | Cole | G07F 17/32<br>463/46 |
| 2005/0113163 | A1 | 5/2005 | Mattice | |
| 2006/0014586 | A1 | 1/2006 | Gatto | |
| 2006/0073868 | A1 | 4/2006 | Nordman | |
| 2006/0183544 | A1 | 8/2006 | Okada | |
| 2007/0035164 | A1 | 2/2007 | North | |
| 2007/0045960 | A1 | 3/2007 | Knoll | |
| 2007/0197301 | A1 | 8/2007 | Cole | |
| 2008/0182642 | A1 | 7/2008 | Cole | |
| 2008/0194326 | A1 | 8/2008 | Brunet De Courssou | |
| 2008/0263769 | A1 * | 10/2008 | Newkirk | A61G 12/008<br>5/503.1 |
| 2009/0102419 | A1 | 4/2009 | Gwon | |
| 2009/0176568 | A1 | 7/2009 | Reddy | |
| 2009/0187125 | A1 | 7/2009 | Tran | |
| 2009/0233681 | A1 | 9/2009 | Tsukahara | |
| 2009/0264194 | A1 | 10/2009 | Kompella | |
| 2009/0264195 | A1 | 10/2009 | Kompella | |
| 2009/0276320 | A1 | 11/2009 | Butler | |
| 2009/0280911 | A1 | 11/2009 | Tsao | |
| 2010/0075755 | A1 | 3/2010 | Steelman | |
| 2010/0087249 | A1 | 4/2010 | Rowe | |
| 2010/0120530 | A1 | 5/2010 | Lesley | |
| 2010/0144420 | A1 | 6/2010 | Fiore | |
| 2010/0201165 | A1 * | 8/2010 | Dankovich | A47C 7/38<br>248/398 |
| 2011/0118034 | A1 | 5/2011 | Jaffe | |
| 2012/0004030 | A1 | 1/2012 | Kelly | |
| 2012/0051520 | A1 | 3/2012 | Hoernig | |
| 2012/0122569 | A1 | 5/2012 | Kowolik | |
| 2013/0023337 | A1 * | 1/2013 | Bowers | G07F 17/3209<br>463/25 |
| 2013/0137524 | A1 | 5/2013 | Scott | |
| 2014/0141886 | A1 | 5/2014 | Woels | |
| 2015/0087403 | A1 | 3/2015 | Castro | |

OTHER PUBLICATIONS

Office Action (Non-Final Rejection) dated Jun. 23, 2022 for U.S. Appl. No. 17/107,526 (pp. 1-9).
Office Action (Notice of Allowance and Fees Due (PTOL-85)) dated Oct. 11, 2022 for U.S. Appl. No. 17/107,526 (pp. 1-8).
Office Action (Non-Final Rejection) dated Jun. 6, 2023 for U.S. Appl. No. 18/155,619 (pp. 1-9).
Office Action (Final Rejection) dated Oct. 10, 2023 for U.S. Appl. No. 18/155,619 (pp. 1-9).
Office Action (Notice of Allowance and Fees Due (PTOL-85)) dated Feb. 14, 2024 for U.S. Appl. No. 18/155,619 (pp. 1-7).

* cited by examiner

METHOD AND SYSTEM FOR A GAMING SYSTEM USER INTERFACE

CROSS REFERENCE TO RELATED APPLICATIONS

This application is a continuation of U.S. application Ser. No. 18/155,619, filed Jan. 17, 2023, which is a continuation of U.S. application Ser. No. 17/107,526, filed Nov. 30, 2020, and issued as U.S. Pat. No. 11,568,705, which is a divisional of, and claims priority to, U.S. application Ser. No. 14/498,638, filed Sep. 26, 2014, and issued as U.S. Pat. No. 10,854,039, the contents of which are hereby incorporated in their entirety.

BACKGROUND

This description relates to gaming machines, and, more particularly, to a method and system for enhancing player comfort and ergonomics in gaming machines.

Gaming machines have evolved to a substantially consistent form due to interchangeability and standardization considerations. For example, button layouts follow a standard linear arrangement in which players' must adjust their reach to accomplish different actions. Rather than assuming a more ergonomic configuration that is less fatiguing to players, buttons of gaming machines are arranged at consistent intervals in a straight line pattern. Additionally, gaming cabinets have a footprint at floor level that is either similar to and that exceeds the dimensions of the game itself. Often, gaming machines are placed on box stands to elevate them to a consistent height. However, the box stands also extend to a footprint that meets or exceeds the dimensions of the game. Players at such gaming machines are constantly at odds of being near enough to the machine to comfortably reach the game buttons, but far enough away from the gaming machine to have room to place their feet in front of them. Placement of the button panel or button deck is generally fixed on the front of the cabinet and is not adjustable to facilitate game play or player comfort.

Such discomforts and poor ergonomics affect player satisfaction with the gaming machine and the gaming experience and may affect revenues of the affected machines.

BRIEF DESCRIPTION

In an aspect, a gaming machine includes a base, a columnar pedestal extending vertically from the base, the pedestal having a cross-sectional area, a width, and a depth that are less than each of a corresponding cross-sectional area, width, and depth of the base, and a button deck adjustably coupled to the pedestal. The button deck includes an upper surface including a transparent touchscreen element, a lower surface opposite the upper surface, and a button deck body extending therebetween. At least one of the lower surface and the body including one or more transparent display elements, the one or more transparent display elements configured to generate one or more images of gaming machine control actuators viewable on the upper surface, the transparent touchscreen element configured to receive from a user at least one of touches and gestures indicating control inputs to the gaming machine, the at least one of touches and gestures corresponding to the generated images. The gaming machine also includes a player tracking card reader positioned within the button deck and accessible through a slot in a front edge of the button deck, the player tracking card reader communicatively coupled to a player tracking display area of the gaming machine.

In another aspect, a gaming machine includes a pedestal configured to support one of a plurality of interchangeable game cabinets through a pedestal mating flange configured to engage a complementary game cabinet flange, one or more mating plugs configured to engage a complementary one or more mating plugs positioned proximate the mating flanges, the mating plugs configured to join respective signal and power conduits between the pedestal and the game cabinet. The gaming machine also includes a button deck adjustably coupled to the pedestal. The button deck includes an upper surface including a transparent touchscreen element, a lower surface opposite the upper surface, and a button deck body extending therebetween. At least one of the lower surface and the body including one or more transparent display elements, the one or more transparent display elements configured to generate one or more images of gaming machine control actuators viewable on the upper surface, the transparent touchscreen element configured to receive from a user at least one of touches and gestures indicating control inputs to the gaming machine, the at least one of touches and gestures corresponding to the generated images.

In a further aspect, a gaming machine pedestal includes a button deck adjustably coupled to the pedestal, the button deck including one or more extendable arms, each arm coupled at one end to the pedestal and at a second end to the button deck, the button deck extendable away from and towards the pedestal, and a player tracking card reader positioned within the button deck and accessible through a slot in a front edge of the button deck.

BRIEF DESCRIPTION OF THE DRAWINGS

FIG. 1 is a perspective view of a gaming machine in accordance with an example embodiment of the present disclosure.

FIG. 2 is a perspective view of a lower portion of the game cabinet in accordance with an example embodiment of the present disclosure.

FIG. 3 is an enlarged perspective view of the button deck shown in FIG. 1.

FIG. 4 is an illustration of embodiments of connections of the button deck to the column.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to gaming machine embodiments providing player comfort and ergonomic considerations in industrial, commercial, and residential applications.

The following description refers to the accompanying drawings, in which, in the absence of a contrary representation, the same numbers in different drawings represent similar elements.

Figure 1:
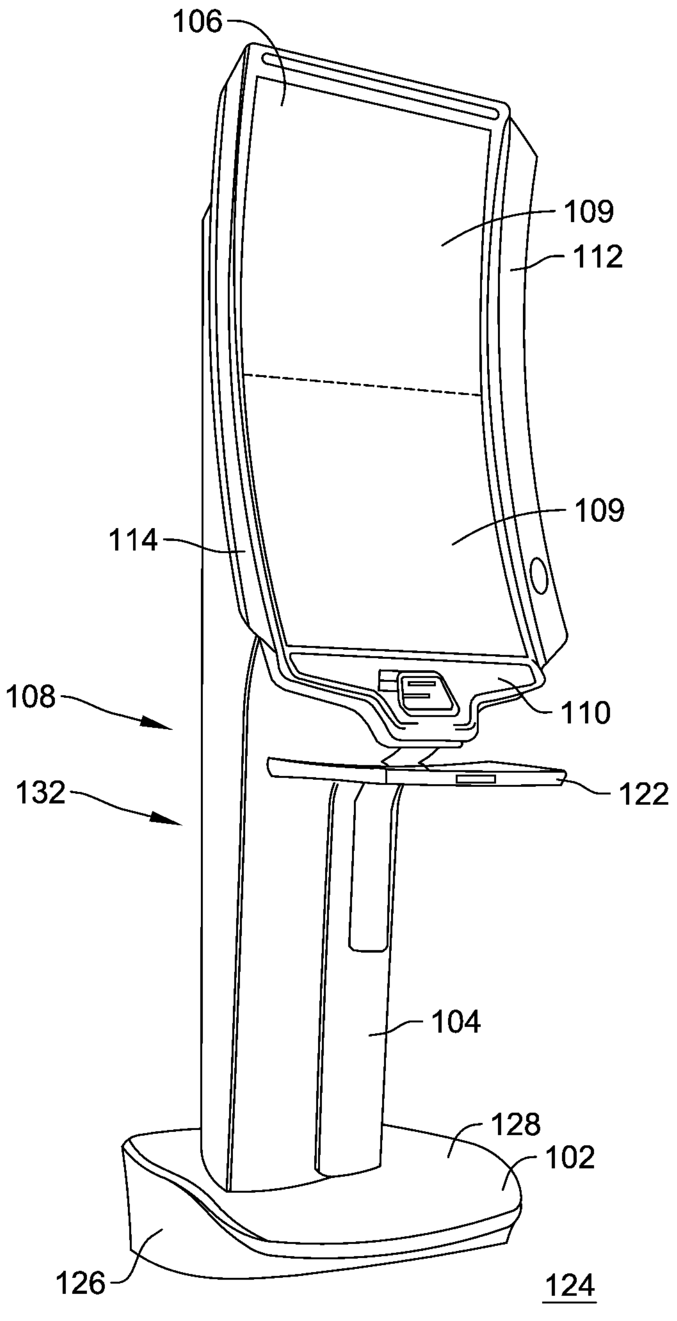
FIGS. 1-4 show example embodiments of the method and apparatus described herein.

FIG. 1 is a perspective view of a gaming machine 100 in accordance with an example embodiment of the present disclosure. In the example embodiment, gaming machine 100 includes a base 102 and a column 104 supported by base 102. A game cabinet 106 is coupled to an upper portion 108 of column 104. Game cabinet 106 includes one or more video display panels 109, a plurality of auxiliary devices, such as, but, not limited to a first user interface 110, a first side panel 112, and a second side panel 114. Gaming machine 100 also includes a button deck 122 adjustably coupled to column 104, game cabinet 106, and/or first user interface 110.

In the example embodiment, base 102 is configured to rest on or be coupled to a lower horizontal surface such as, but, not limited to, a floor 124. Base 102 includes one or more vertically upwardly extending sidewalls 126, which may include straight panels, and/or curved and contoured panels, such as, but, not limited to a circular, oval, oblong, and/or irregularly curved cross-section. Base 102 includes an upper surface 128 configured to fair base 102 by producing a closed smooth outline, support column 104, and/or provide a resting place for a user's feet.

Column 104 is a rigid, relatively slender, upright support, composed of relatively few components that extends vertically between base 102 and game cabinet 106. In various embodiments, column 104 includes a cylindrical or polygonal shaft 132. Column 104 houses various components and conduits that are configured to support the operation of gaming machine 100 and its integration into a larger operation and control network (not shown), in which gaming machine 100 is in communication.

Figure 2:
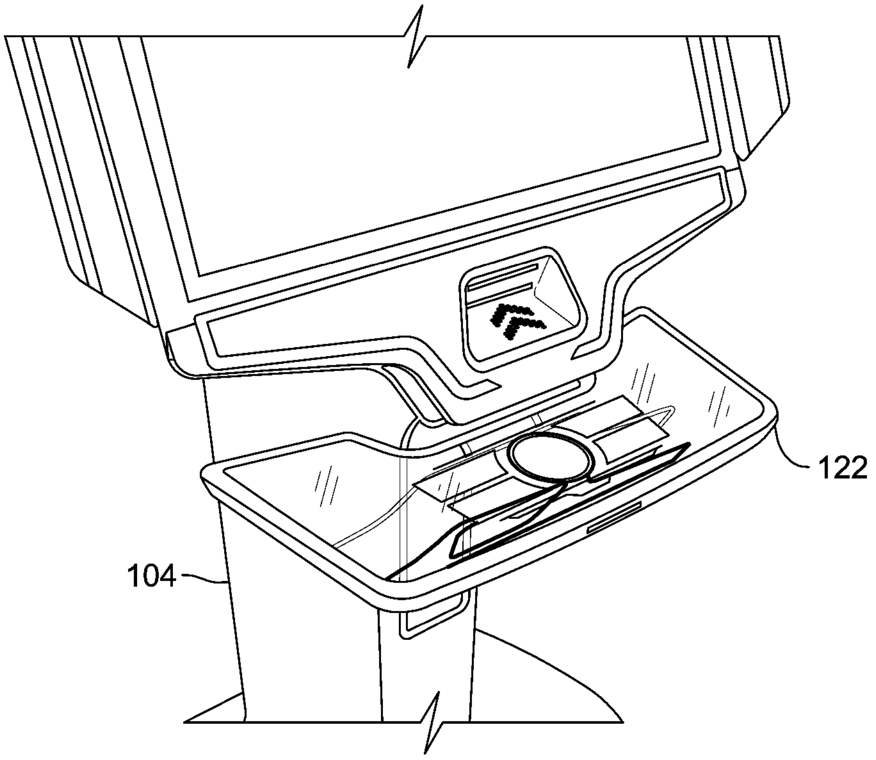

In various embodiments, button deck 122 is mounted to column 104 and is controlled through a gaming machine 100 controller (not shown in FIGS. 1 and 2). In one embodiment, button deck 122 is configured to translate with respect to column 104 in a single direction, for example, towards and away from column 104. In some embodiments, the translation is controlled manually by the user, automatically by a motor, or combinations thereof. For example, when gaming machine 100 detects a user entering a proximity of gaming machine 100, button deck 122 may be commanded to translate in either direction to indicate to the user that button deck 122 is movable. The user may then adjust button deck 122 manually by hand, manually through operation of a switch controlling the button deck motor, or allow button deck 122 to be controlled automatically by gaming machine 100. The user may also turn off the automatic translation feature using an override switch (not shown). Button deck 122 may be configured to translate in a plurality of directions and/or rotate around a plurality of axes to suit the user's comfort and ergonomic control.

Figure 3:
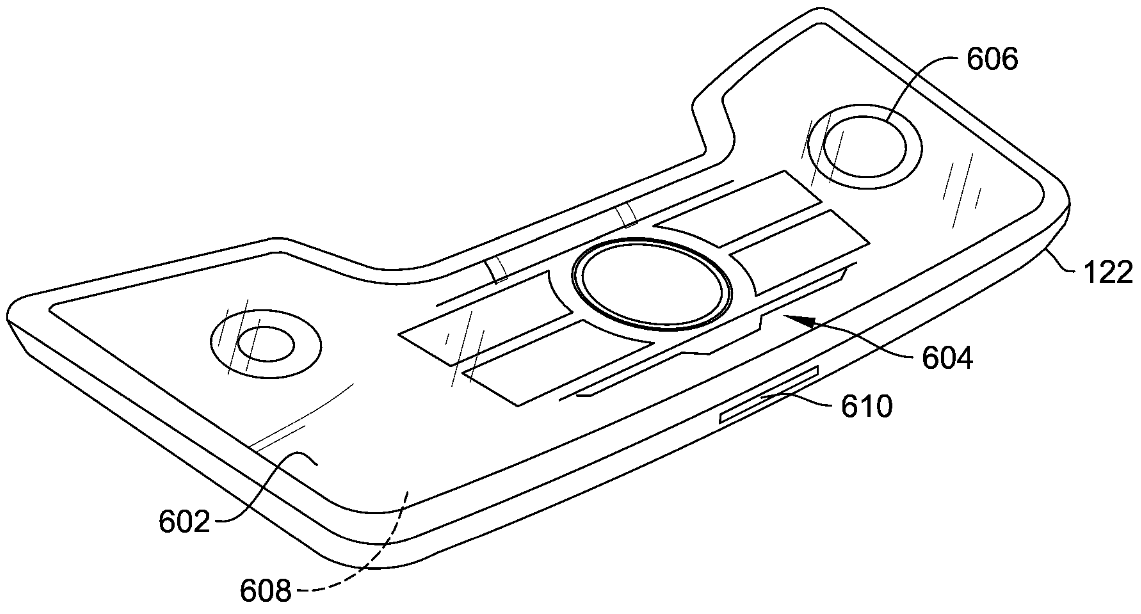

FIG. 2 is a perspective view of a lower portion of game cabinet 106 in accordance with an example embodiment of the present disclosure. FIG. 3 is an enlarged perspective view of button deck 122. In the example embodiment, button deck 122 includes an upper input surface 602 that may be embodied in a touchscreen surface or may be embodied in a combination of touchscreen elements 604 and mechanical input devices 606. For example, upper input surface 602 may include touchscreen elements for inputting various wager amounts, a "service" call button, a "cash-out" button, and other input requirements and also include a mechanical "spin" button 606. Touchscreen elements 604 may be isolated to certain areas of surface 602 and may be fixed in their function. However, in some embodiments, touchscreen elements 604 may be relocatable on surface 602 and may be reconfigurable to perform different functions during different portions of a game or for different games, such as when game cabinet 106 is interchanged. In one embodiment, button deck 122 is at least partially transparent or translucent, which permits a user to see through button deck 122, permits light from sources below button deck 122 to be seen by the user, and gives an appearance of mechanical "spin" button 606 and touchscreen elements 604 floating in front of the user.

Upper input surface 602 also may include an element 608 configured to control an opacity of button deck 122. Element 608 may comprise a liquid crystal display (LCD) element or other element configured to be electrically controlled to alter its transmissive properties. Element 608 may be configured to control opacity of button deck 122 as a whole or may be configured to control smaller regions of button deck 122 to present graphical objects to the user.

Button deck 122 also includes a card reader 610 for player tracking and communication. Card reader 610 is a part of a player tracking system that receives a player tracking card inserted and removed by the user. Card reader 610 transfers information stored on a player card to gaming machine 100. Gaming machine 100 is configured to provide player information on a player information portion (not shown in FIG. 6) of video display panel 109. In one embodiment, the player information portion is a reserved area that can be observed during game play. In other embodiments, the player information portion is overlaid onto a game screen during play or between games. When the player information portion is reserved, player information may only be displayed during predetermined times or when activated by the user. In other embodiments, the player information is dimmed or grayed out so as not to detract from the appearance of the game during game play.

Figure 4:
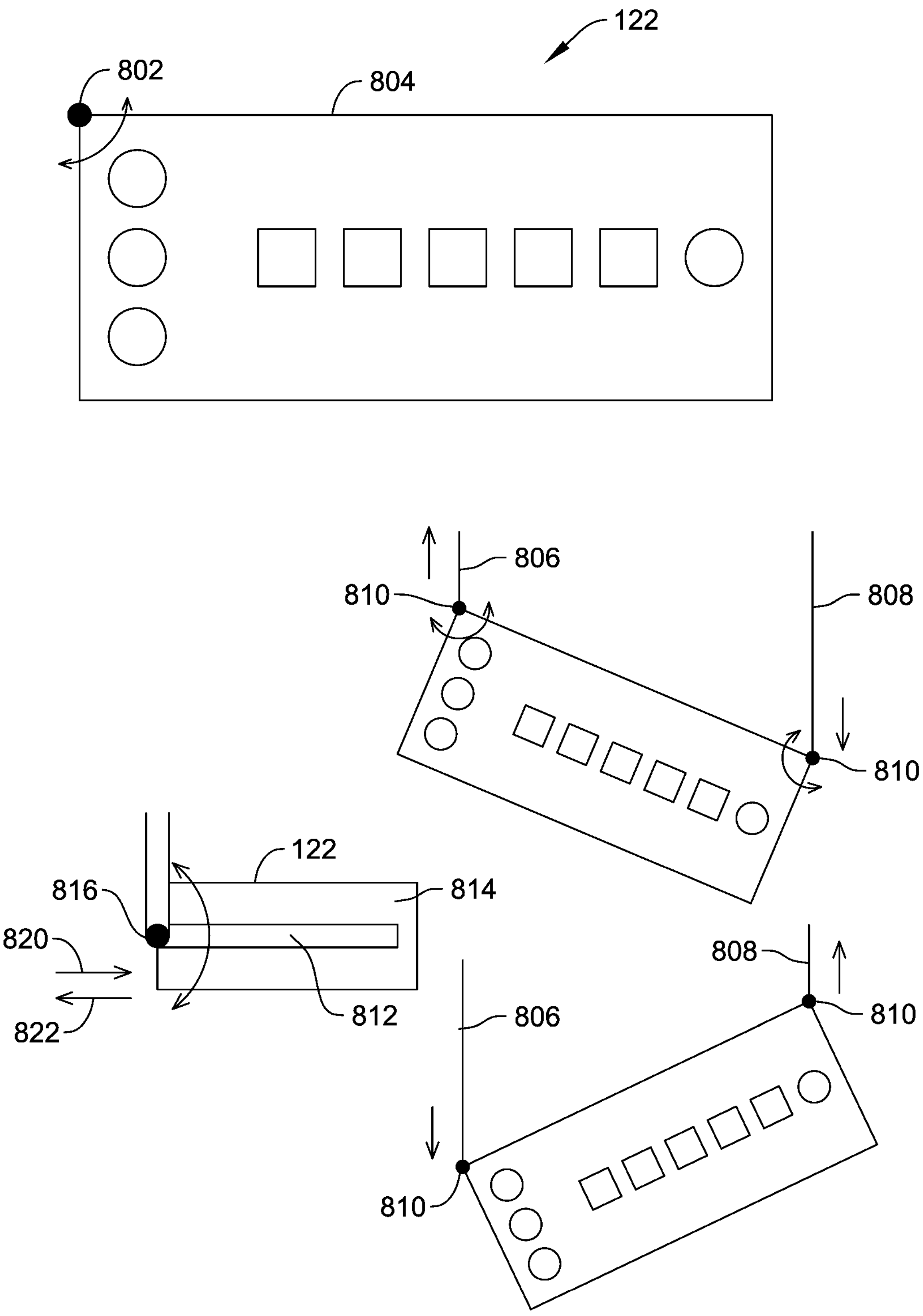

FIG. 4 is an illustration of embodiments of connections of button deck 122 to column 104. In a first alternative embodiment, button deck 122 is pivotally coupled to column 104 through a pivot point 802 located along a rear edge 804 of button deck 122. In the example embodiment, pivot point 802 is positioned in a corner of button deck 122, however pivot point 802 can be located at any position along rear edge 804. A second alternative embodiment includes a first support arm 806 and a second support arm 808. In the example embodiment, support arms 806 and 808 are telescoping in that one of first support arm 806 and second support arm 808 may be extended at different rates and/or distances to permit button deck 122 to be angled with respect to column 104. Such an orientation may be beneficial to, for example, a user that is not positioned directly in front of gaming machine 100. To support such movement, a connection point 810 between first support arm 806 and second support arm 808 and button deck 122 is pivotable about connection point 810. A third alternative embodiment is illustrated where a track 812 along an underside 814 of button deck 122 is configured to receive a pivotable knob 816 coupled to an arm 818 extending from column 104. During operation, button deck 122 can be translated laterally along track 812 in a first direction 820 or a second direction 824 and/or rotated about knob 816 at any point along track 812.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gaming device comprising:

a cabinet;

a button deck adjustably coupled to the cabinet; and a pair of extendable arms coupling the button deck to the cabinet, the extendable arms each being coupled to the cabinet and pivotably coupled to the button deck, the extendable arms being independently telescopingly extendable away from and towards the cabinet for translating and pivoting the button deck relative to the cabinet.

2. The gaming device of claim 1, wherein the pair of extendable arms includes a first extendable arm and a second extendable arm, and wherein the button deck is adjustable relative to the cabinet to position the button deck in a first orientation, in which a length of the first extendable arm is greater than a length of the second extendable arm, and a second orientation relative to the cabinet, in which the length of the second extendable arm is greater than the length of the first extendable arm.

3. The gaming device of claim 2, wherein the button deck is oriented at a first angle relative to the cabinet when in the first orientation, the button deck being oriented at a second, different angle relative to the cabinet when in the second orientation.

4. The gaming device of claim 1, wherein the pair of extendable arms includes a first extendable arm and a second extendable arm, the gaming device further comprising a first pivotable connector coupling the first extendable arm to the button deck, wherein the first pivotable connector facilitates pivoting the button deck about a first rotational axes extending through the first pivotable connector.

5. The gaming device of claim 4, further comprising a second pivotable connector coupling the second extendable arm to the button deck, wherein the second pivotable connector facilitates pivoting the button deck about a second rotational axis extending through the second pivotable connector, wherein the second rotational axis is offset from the first rotational axis.

6. The gaming device of claim 5, wherein the first and second rotational axes are each perpendicular to the first direction.

7. The gaming device of claim 5, wherein the first pivotable connector is positioned at a first corner of the button deck and the second pivotable connector is positioned at a second corner of the button deck, wherein the first corner is defined at an opposite side of the button deck from the second corner.

8. The gaming device of claim 5, wherein the button deck extends between a front edge of the button deck and an opposed rear edge, wherein the first and second pivotable connectors are each positioned at the rear edge.

9. The gaming device of claim 8, wherein the button deck further comprises a first side and a second side each extending from the rear edge to the front edge, the button deck extending laterally between the first side and the second side, and wherein the first pivotable connector is positioned adjacent the first side and the second pivotable connector is positioned adjacent the second side.

10. The gaming device of claim 1 further comprising a player tracking card reader positioned within the button deck and accessible through a slot in a front edge of the button deck.

11. The gaming device of claim 1, wherein the button deck is configured to translate in a plurality of directions and rotate around a plurality of axes.

12. A button deck assembly for use with a gaming device having a cabinet, the button deck comprising:

a button deck including at least one user-interface element configured to receive a user input; and a pair of extendable arms configured to couple the button deck to the cabinet, the extendable arms each being pivotably coupled to the button deck, the extendable arms being independently telescopingly extendable away from and towards the cabinet for translating and pivoting the button deck relative to the cabinet.

13. The button deck assembly of claim 12, wherein the pair of extendable arms includes a first extendable arm and a second extendable arm, and wherein the button deck is adjustable relative to the cabinet to position the button deck in a first orientation, in which a length of the first extendable arm is greater than a length of the second extendable arm, and a second orientation relative to the cabinet, in which the length of the second extendable arm is greater than the length of the first extendable arm.

14. The button deck assembly of claim 13, wherein the button deck is oriented at a first angle relative to the cabinet when in the first orientation, the button deck being oriented at a second, different angle relative to the cabinet when in the second orientation.

15. The button deck assembly of claim 12, wherein the pair of extendable arms includes a first extendable arm and a second extendable arm, the button deck assembly further comprising a first pivotable connector coupling the first extendable arm to the button deck, wherein the first pivotable connector facilitates pivoting the button deck about a first rotational axes extending through the first pivotable connector.

16. The button deck assembly of claim 15, further comprising a second pivotable connector coupling the second extendable arm to the button deck, wherein the second pivotable connector facilitates pivoting the button deck about a second rotational axis extending through the second pivotable connector, wherein the second rotational axis is offset from the first rotational axis.

17. The button deck assembly of claim 16, wherein the first and second rotational axes are each perpendicular to the first direction.

18. The button deck assembly of claim 16, wherein the first pivotable connector is positioned at a first corner of the button deck and the second pivotable connector is positioned at a second corner of the button deck, wherein the first corner is defined at an opposite side of the button deck from the second corner.

19. The button deck assembly of claim 16, wherein the button deck includes a front edge and an opposed rear edge, wherein the first and second pivotable connectors are each positioned at the rear edge.

20. A method for adjusting a button deck of a gaming machine, the method comprising:

coupling a first extendable arm and a second extendable arm to a cabinet of the gaming machine;

pivotably coupling the first extendable arm and the second extendable arm to the button deck;

extending, telescopingly, the first extendable arm and the second extendable arm to translate the button deck relative to the cabinet; and extending, telescopingly, one of the first extendable arm and the second extendable arm to pivot the button deck relative to the cabinet.

* * * * *